(12) United States Patent
Date

(10) Patent No.: US 6,293,703 B1
(45) Date of Patent: Sep. 25, 2001

(54) BEARING DEVICE FOR MACHINE TOOL SPINDLE

(75) Inventor: Takao Date, Shizuoka-ken (JP)

(73) Assignee: Toshiba Kikai Kabushiki Kaisha, Kawasaki (JP)

( * ) Notice: Subject to any disclaimer, the term of this patent is extended or adjusted under 35 U.S.C. 154(b) by 0 days.

(21) Appl. No.: 09/688,988

(22) Filed: Oct. 17, 2000

Related U.S. Application Data

(62) Division of application No. 09/210,940, filed on Dec. 15, 1998, now Pat. No. 6,158,895.

(30) Foreign Application Priority Data

Dec. 16, 1997 (JP) .................................................... 9-346749

(51) Int. Cl.⁷ .................................................... F16C 37/00
(52) U.S. Cl. ............................ 384/476; 384/493; 384/900
(58) Field of Search .................................... 384/476, 493, 384/557, 900, 517, 519, 520, 551, 563, 583, 905

(56) References Cited

U.S. PATENT DOCUMENTS

| | | |
|---|---|---|
| 3,326,613 | 6/1967 | Renker . |
| 3,826,545 | 7/1974 | McKee . |
| 4,402,559 * | 9/1983 | Shibata et al. .................... 384/900 X |
| 4,602,874 * | 7/1986 | Neugebauer .......................... 384/476 |
| 5,192,139 * | 3/1993 | Hiramoto et al. .................... 384/476 |

FOREIGN PATENT DOCUMENTS

| | | |
|---|---|---|
| 2-279203 | 11/1990 | (JP) . |
| 8-200359 | 8/1996 | (JP) . |

* cited by examiner

*Primary Examiner*—Thomas R. Hannon
(74) *Attorney, Agent, or Firm*—Finnegan, Henderson, Farabow, Garrett & Dunner, L.L.P.

(57) ABSTRACT

Two angular contact ball bearings (5,7) are arranged in a backside combination manner for supporting a machine tool spindle (3), a spindle head body (1) serves as a bearing case for holding the angular bearings, an inner collar (9) is disposed between inner races (5i, 7i) of the angular bearings, an outer collar (13) is disposed between outer races (5o, 7o) of the angular bearings, the outer collar is set to be longer in an axial direction than the inner collar to provide preloads to the angular bearings, the outer collar is made of a material having a smaller thermal expansion coefficient than the bearing case, the machine tool spindle and the inner collar.

1 Claim, 4 Drawing Sheets

BEARING DEVICE FOR MACHINE TOOL SPINDLE

This is a division of application Ser. No. 09/210,940, filed Dec. 15, 1998 now U.S. Pat. No. 6,158,895 which is incorporated herein by reference.

BACKGROUND OF THE INVENTION

1. Field of the Invention

The present invention relates to a bearing device for machine tool spindle, and in particular, to a bearing device for a spindle of machine tool using an angular contact ball bearing.

2. Description of Relevant Art

Spindles of machine tools have bearing devices therefor, which need high rotation accuracy and, to reduce backlashes, mostly employ a plurality of angular contact ball bearings (hereafter sometimes called "angular bearing" [a bearing with a nominal contact angle between 0° and 90°) that are preloaded before use and arrayed to constitute a so-called combination bearing. For supporting spindles, typically employed is a backside combination type, as it is advantageous in that a supporting span for spindle can be set large.

For the preloading, a combination bearing includes an intervening inner collar (hereafter simply called "inner collar") between inner races of two angular contact bearings and an intervening outer collar (hereafter simply called "outer collar") between outer races of the angular contact bearings, which outer collar has an axial length different from an axial length of the inner collar so that the angular contact bearings are preloaded by the difference of length dimension. In the backside combination type, angular bearings have an increased preload, as the difference of axial length increases between an inner collar and an outer collar longer than the inner collar.

In recent machine tools, the number of revolutions per unit time (hereafter sometimes referred to as "rpm [revolutions per minute]") of a spindle is enhanced to a remarkable high speed. There are performed an increasing number of high-speed operations exceeding a 1000 rpm by far. As the spindle rpm is increased to a high speed, the influence of accompanying centrifugal forces to a bearing service life has become a significant problem.

In other words, as the rotation of a spindle is raised to a higher speed, the spindle and associated rotation members such as bearing inner races are urged radially outwards with increased magnitudes of centrifugal forces, in addition to that also balls are pushed against outer races by centrifugal forces acting thereon, with the result that the preload is increased.

Further, the spindle of the machine tool needs a sufficient rigidity to endure metal processing, and the diameter of the spindle as well as the ball weight of associated bearings is large. As a result, centrifugal forces acting on bearings of the machine tool spindle are by far larger than those acting on a small-diameter bearing of a high-speed rotation shaft in a general machine, so that the load imposed on the bearings tends to be excessive and causes a bearing service life to be remarkably reduced.

To this point, Japanese Patent Application Laid-Open Publication No. 2-279203 has proposed an arrangement in which a hydraulic piston mechanism is incorporated in a bearing section, and a hydraulic supply pressure to the piston mechanism is changed to thereby change an axial relative position of inner and outer races so that a bearing preload is changed.

Further, Japanese Patent Application Laid-Open Publication 8-200359 has proposed an arrangement in which an inner collar is made of a material that has a larger thermal expansion coefficient than a spindle, and a bearing preload under high speed rotation is reduced by the difference of thermal expansions between the inner collar and the spindle.

Further, as the spindle rotation becomes higher in speed, heat generation at a bearing portion is increased and a temperature rise in a whole spindle system is increased by the heat so that thermal deformation remarkably decreases the processing accuracy, and techniques are employed such that a bearing case, such as in the form of a spindle head body that holds an outer race, is provided with an oil jacket and a coolant is let to flow through the jacket to thereby cool the bearing portion from the outer race side.

However, in arrangements in which the bearing preload is changed by a hydraulic piston mechanism like Japanese Patent Application Laid-Open Publication No. 2-279203, the hydraulic piston mechanism has to be incorporated in a bearing section, and the number of component parts becomes large and the structure is complicated, and besides there is required a hydraulic pressure control device which may have a large scale.

On the contrary, in arrangements in which an inner collar is made of a material that has a larger thermal expansion coefficient than a spindle like Japanese Patent Application Laid-Open Publication 8-200359, the number of component parts is not increased and the structure is not complicated. But, there is employed an outer race and an inner race. The outer race is fitted in a bearing case, such as in the form of a spindle head body, with a clearance. However, as the inner race is fitted strongly tight on an outer circumference of the spindle, large frictional forces arise when the inner collar is axially displaced by a difference of thermal expansion relative to the spindle, so that the inner race is kept from slipping to make an inherent smooth displacement relative to the spindle in dependence on a thermal deformation of the inner collar, and it becomes difficult to control a varying preload in accordance with a design value.

Further, in employment of techniques for providing a cooling mechanism, such as in the form of an oil jacket, to a bearing case, such as in the form of a spindle head body, to thereby cool a bearing section from an outer race side, there arise temperature differences between the bearing case and an outer race and between the outer race and an inner race, which cause differences in thermal expansion of respective associated parts (as thermal expansions at the spindle side are larger), by which a radial clearance of the bearing becomes blocked, and heat generation at bearing section may be increased on the contrary. To avoid this, the bearing has to be assembled with backlashes intentionally given, which will reduce the accuracy of spindle rotation and the rigidity to support the spindle.

SUMMARY OF THE INVENTION

The present invention has been achieved with such points in view.

It therefore is an object of the present invention to provide a bearing device for machine tool spindle which permits the bearing preload to be adequately reduced at a high-speed rotation without having a complicated structure and which allows the accuracy of spindle rotation and the spindle supporting rigidity to be kept without needing a bearing to be assembled with backlashes given to avoid an increase of heat generation at a bearing section due to a cooling of a bearing case.

To achieve the object, a first aspect of the invention provides a bearing device for machine tool spindle, comprising a pair of angular contact ball bearings arranged in a backside combination manner for supporting a machine tool spindle, a bearing case for holding the pair of angular contact ball bearings, an inner collar disposed between inner races of the pair of angular contact ball bearings, and an outer collar disposed between outer races of the pair of angular contact ball bearings, the outer collar having an axial length longer than an axial length of the inner collar to provide a preload to the pair of angular contact ball bearings, the outer collar comprising a thermal expansion material having a smaller thermal expansion coefficient than an arbitrary one of the bearing case, the machine tool spindle and the inner collar.

In the bearing device according to the first aspect, the outer collar has a thermal expansion coefficient smaller than thermal expansion coefficients of the bearing case, the machine tool spindle and the inner collar, and when heat is generated at a bearing portion by high speed rotation of the machine tool spindle, the outer collar has a smaller thermal expansion per unit length, which reduces a dimensional difference between the outer collars and the inner collars, and the outer collar makes an axial displacement so that the preload to the angular contact ball bearings is reduced.

Accordingly, the angular contact ball bearings are kept from having excessive loads imposed thereon even when large centrifugal forces act, and their service life will not be reduced by such loads.

According to a second aspect of the invention, the outer collar is axially divided into a plurality of collar members including a collar member made of a general machine structural material and a collar member made of the thermal expansion material.

According to the second aspect, the outer collar comprises a combination of collar members including an outer collar member made of a low thermal expansion material and an outer collar member made of a general machine structural material, and a combination of thermal expansion characteristics of the collar members provides a thermal expansion characteristic, i.e. a spindle rpm vs. preload characteristic, of an entirety of the outer collar. Accordingly, the thermal expansion characteristic of the outer collar can be adequately set with an increased flexibility without limitations such as from a total length of the outer collar and employed materials, and the angular contact ball bearings are kept from having excessive loads imposed thereon even when large centrifugal forces act, and their service life will not be reduced by such loads.

According to a third aspect of the invention, the thermal expansion material of the outer collar is an Invar family metal, and the arbitrary one of the bearing case, the machine tool spindle and the inner collar comprises one of a cast iron and a structural steel.

According to the third aspect, the thermal expansion coefficient of the outer collar can be adequately set to be smaller than those of the bearing case, the machine tool spindle and the inner collar.

Moreover, to achieve the object described, a fourth aspect of the invention provides a bearing device for machine tool spindle, comprising a pair of angular contact ball bearings for supporting a machine tool spindle, a bearing case for holding the pair of angular contact ball bearings, an inner collar disposed between inner races of the pair of angular contact ball bearings, an outer collar disposed between outer races of the pair of angular contact ball bearings, the outer collar having an axial length longer than an axial length of the inner collar to provide a preload to the pair of angular contact ball bearings, the outer collar being formed with a coolant path, and a controller for performing a temperature control of a coolant flowing in the coolant path to control a thermal expansion of the outer collar.

According to the fifth aspect, the thermal expansion of the outer collar can be controlled by the temperature control of the coolant flowing the coolant path formed in the outer collar, and a bearing preload can be controlled by the thermal expansion control to an arbitrary value from outside. Accordingly, the angular contact ball bearings are kept from having excessive loads imposed thereon even when large centrifugal forces act, and their service life will not be reduced by such loads.

Further, to achieve the object described, a fifth aspect of the invention provides a bearing device for machine tool spindle, comprising a pair of angular contact ball bearings for supporting a machine tool spindle, an inner collar disposed between inner races of the pair of angular contact ball bearings, an outer collar disposed between outer races of the pair of angular contact ball bearings, and a bearing case for holding the pair of angular contact ball bearings, the bearing case being provided with a cooling mechanism, the bearing case comprising a thermal expansion material having a higher thermal expansion coefficient than an arbitrary one of the outer races.

According to the fifth aspect, a bearing portion is cooled from an outer race side by a cooling of the bearing case. By the cooling, temperature differences may arise between the bearing case and the outer races and between the outer races and the inner races. However, the bearing case has a larger thermal expansion coefficients than the outer races, and has a larger thermal expansion, which prevents a radial clearance of bearing from being blocked or undesirably reduced. Accordingly, an accuracy of spindle rotation and a spindle supporting rigidity can be kept without the need of assembling the bearings with backlashes given to avoid an increase of heat generation at the bearing portion due to the cooling of the bearing case.

According to a sixth aspect of the invention, the thermal expansion material of the bearing case is a stainless steel.

According to the sixth aspect, the thermal expansion coefficient of the bearing case can be adequately set to be higher than that of the outer collar.

BRIEF DESCRIPTION OF THE ACCOMPANYING DRAWINGS

The above and further objects and novel features of the present invention will more fully appear from the following detailed description when the same is read in conjunction wit accompanying drawings, in which.

DETAILED DESCRIPTION OF THE PREFERRED EMBODIMENTS

Figure 1:
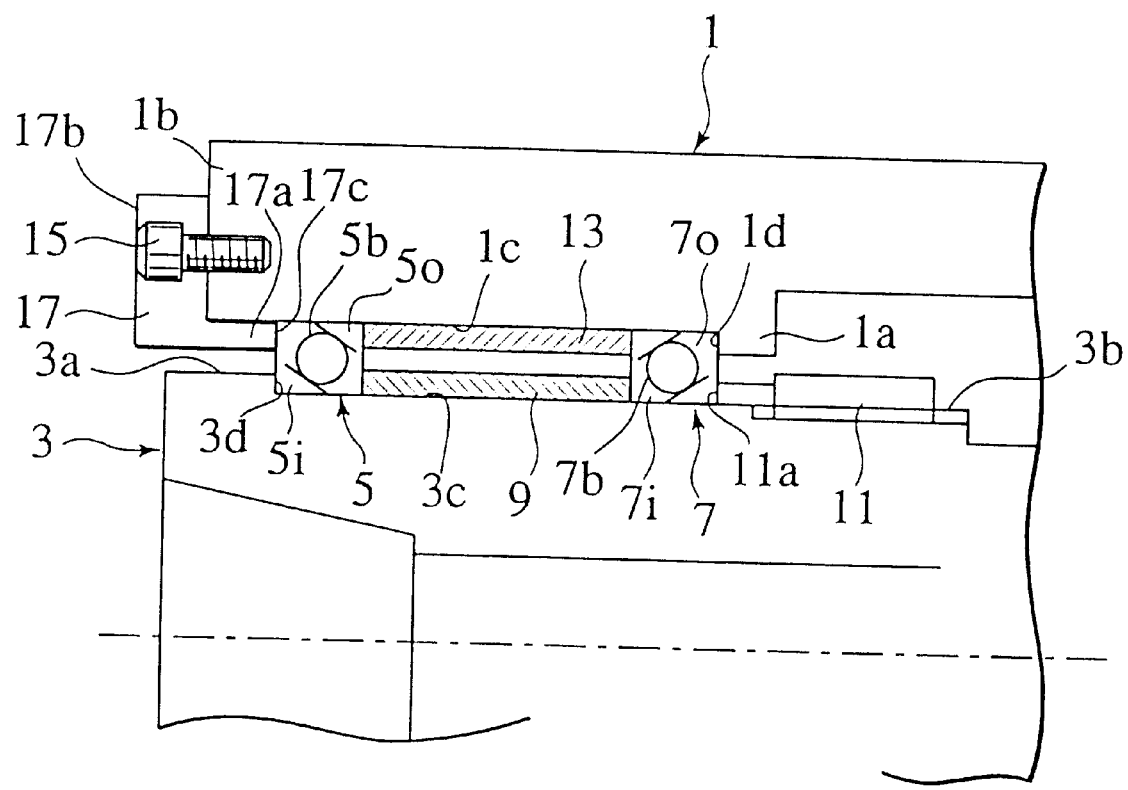
FIG. 1 is a longitudinal section of a bearing device for machine tool spindle according to an embodiment of the invention.

There will be detailed below the preferred embodiments of the present invention with reference to the accompanying drawings. Like members are designated by like reference characters to eliminate redundant description.

FIG. 1 shows a bearing device for a spindle of a machine tool according to a first embodiment of the invention.

In FIG. 1, designated by reference character 1 is a spindle head body (as a bearing case), 3 is the spindle, and 5 and 7 are a pair of front and behind-located (hereafter referred to as "rear") angular bearings arranged to constitute a backside combination.

The front and rear angular bearings 5 and 7 have their balls 5b and 7b and radially inner annular races 5i and 7i. The inner races 5i and 7i of the front and rear bearings 5 and 7 are tight-fitted on a cylindrical outer circumference 3c of the spindle 3, and are held in position in a thrust direction, together with an inner collar 9 put between the inner races 5i and 7i, by combination of a radially outward step part 3a formed at a front end part of the outer circumference 3c of the spindle 3 and a bearing nut 11 screwed on a threaded outer circumferential part 3b of the spindle 3. A stepping wall 3d of the step part 3a and a front end face 11a of the bearing nut 11 abut on axially outer sides of the inner races 5i and 7i, respectively, and front and rear ends of the inner collar 9 abut on axially inner sides of the inner races 5i and 7i. The inner races 5b and 7b and the inner collar 9 are fitted with force on the outer circumference 3c of the spindle 3 from behind, and they can be displaced relative to the spindle 3 if the nut 11 is removed.

The front and rear angular bearings 5 and 7 have their radially outer annular races 5o and 7o, which are fitted in a cylindrical inner circumference 1c of the spindle head body 1 with a designed clearance and which are held in position in the thrust direction, together with an outer collar 13 put between the outer races 5o and 7o, by combination of a radially inward step part 1a of the spindle head body 1 and a bearing stopper 17 fastened to a front end part 1b of the spindle head body 1. The bearing stopper 17 has a cylindrical insertion part 17a axially inserted between the step part 3a of the spindle 3 and the front end part 1b of the spindle head body 1, and a radial flange part 17b fixed by screws 15 to an end face of the front end part 1b of the spindle head body 1. A rear end face 17c of the insertion part 17a of the bearing stopper 17 and a stepping wall 1d of the step part 1a abut on axially outer sides of the outer races 5o and 7o, respectively, and front and rear ends of the outer collar 13 abut on axially inner sides of the outer races 5o and 7o. The outer collar 13 is loose-fitted on the inner collar 9, and free-rotatable thereabout together with the outer races 5o and 7o. The outer races 5o and 7o and the outer collar 13 can be displaced relative to the spindle head body 1 if the stopper 17 is removed.

The outer collar 13 has an initial axial length (set to an ambient or room temperature, a normal temperature or a working temperature at a lower rpm than a designed high rpm) between the front and rear end faces thereof, which axial length is a little longer than an initial axial length between the front and rear end faces of the inner collar 9. A difference between the initial axial lengths of the inner and outer collars 9 and 13 provides preloads to the angular bearings 5 and 7.

The spindle head body 1, the spindle 3 and the inner collar 9 are made of materials substantially equivalent in thermal expansion coefficient to each other ($10 \times 10^{-6}$ or near), e.g. a cast iron and/or a structural steel such as a carbon steel or chromium molybdenum steel. The outer collar 13 is made of a low-thermal-expansion material lower than those in thermal expansion coefficient, e.g. an Invar family metal (Fe alloy with Ni, Mn, C and other element) having a thermal expansion coefficient of $2 \times 10^{-6}$ or near.

As the outer collar 13 is made of Invar family metal and the spindle head body the spindle 3 and the inner collar 9 are made of cast iron and/or structural steel, the thermal expansion coefficient of the outer collar 13 can be set to a lower value than those of the spindle head body 1, spindle 3 and inner collar 9.

In the arrangement described, the spindle 3 rotates at high speeds and an associated bearing portion generates heat, so that the spindle 3, the angular bearings 5 and 7, the inner collar 9, the outer collar 13 and the spindle head body 1 have increased temperatures, respectively, and expand in proportion to their thermal expansion coefficients.

As the thermal expansion coefficient of the outer collar 13 is different from (smaller than) those of the rest, a respective unit length of the outer collar 13 has an axial expansion smaller than axial expansions of unit lengths of the inner collar 9, spindle 3 and spindle head body 1, whereby the inner and outer collars 9 and 13 have their expanded total axial lengths, which have a dimensional difference therebetween, which is smaller than the difference between the initial axial lengths of the inner and outer collars 9 and 13. Accordingly, the outer collar 13 makes a smooth axial displacement relative to the spindle head body 1, so that the angular bearings 5 and 7 have a reduced preload.

Therefore, even when a large centrifugal force is developed, the angular bearings 5 and 7 are kept from having excessive loads acting thereon, and their service life will not be reduced by such loads.

Figure 2:
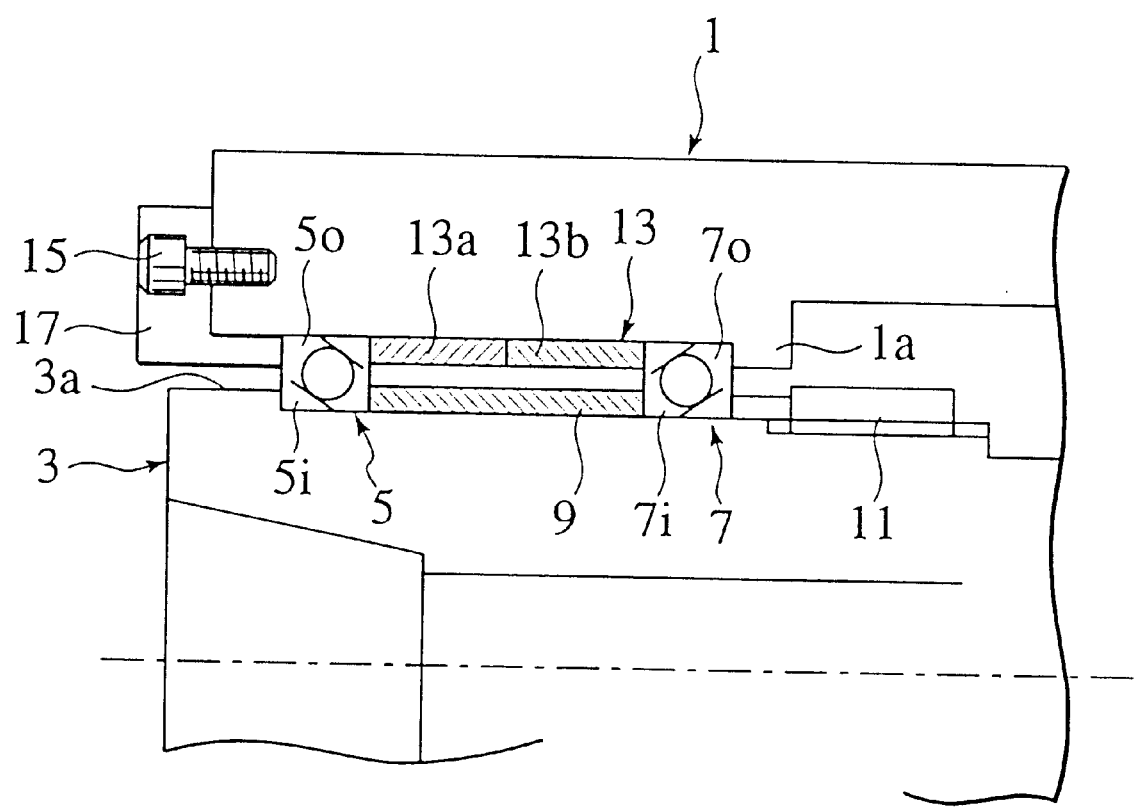
FIG. 2 is a longitudinal section of a bearing device for machine tool spindle according to another embodiment of the invention.

FIG. 2 shows a bearing device for machine tool spindle according to a second embodiment of the invention.

In this embodiment, an outer collar 13 is divided in two in an axial direction, and is composed of a front outer collar 13a and a rear outer collar 13b. The front outer collar 13a is made of an Invar family metal that has a relatively small thermal expansion coefficient. The rear outer collar 13b is made of a machine structure material for general use, such as a carbon steel. The outer collar 13 may be divided into three or more collar members, one or more of which is or are made of a metal or metals of the Invar family.

According to this embodiment, a total axial length of the outer collar 13 comprises a sum of respective axial lengths of the front outer collar 13a of a material of small thermal expansion coefficient and the rear outer collar 13b of a general machine structure material, and has an increased flexibility in design of thermal expansion characteristic of the total length, so that "spindle rpm vs. preload characteristics" can be voluntarily set to adequate values without limitations from outer collar total length and kind of materials.

In this embodiment also, even when a large centrifugal force is developed, a pair of front and rear angular bearings 5 and 7 are kept from having excessive loads acting thereon, and their service life will not be reduced by such loads.

Figure 3:
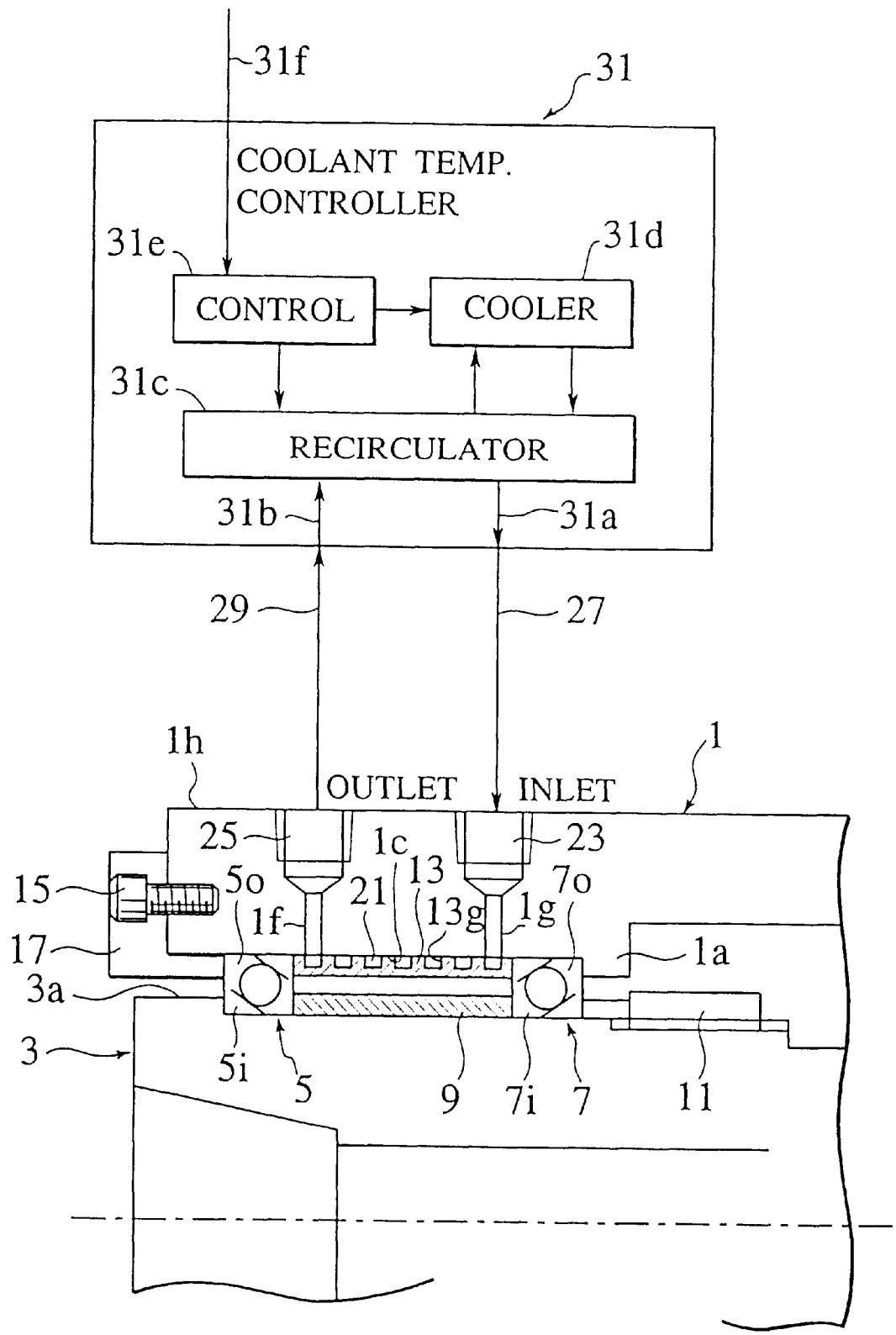
FIG. 3 is a longitudinal section of a bearing device for machine tool spindle according to another embodiment of the invention.

FIG. 3 shows a bearing device for machine tool spindle according to a third embodiment of the invention.

In this embodiment, an outer collar 13 has a spiral groove 3g formed in an outer circumference thereof, which groove 13g cooperates with an inner circumference 1c of a spindle head body 1 to define a coolant path 21 that spirally extends from end to end or between both end parts of the outer collar 13. The coolant path 21 is sealed, as necessary, by associated members. The spiral groove 13g may be replaced by a plurality of circular grooves communicating with each other through axial grooves or holes. The spindle head body 1 is formed with one or more front radial holes 1f that each communicate at an inner end thereof with a front end (or a middle part) of the coolant path 21, and one or more rear radial holes 1g that each communicate at an inner end thereof with a rear end (or a middle part) of the coolant path 21. The rear radial holes 1g each communicate at an outer end thereof with a coolant inlet port 23, which is formed in an outer circumference 1h of the spindle head body 1 for supplying a coolant via the holes 1g to the front end of the coolant path 21. The front radial holes 1f each communicate at an outer end thereof with a coolant outlet port 25, which is formed in the outer circumference 1h of the spindle head body 1 for taking out the coolant from the front end of the coolant path 21 via the holes 1f. The coolant inlet and outlet ports 23 and 25 are connected by external coolant lines 27 and 29 to a coolant delivery line 31a and a coolant return line 31b of a coolant temperature controller 31, respectively.

The coolant temperature controller 31 is constituted as a system or unit which has a coolant recirculating function, a coolant cooling function and a temperature feedback control function, and which comprises a recirculator 31c, a cooler 31d and a controller 31e. The recirculator 31c recirculates a controlled flow rate of the coolant via a recirculation line that includes the coolant delivery and return lines 31a and 31b, the external coolant lines 27 and 29 and the coolant path 21 of the outer collar 13. The cooler 31d is for cooling the coolant to a controlled temperature. The controller 31e controls the recirculator 31c and the cooler 31d to thereby control a supply temperature of the coolant in a feed-back controlling manner so that the outer collar 13 has a controlled temperature in accordance with a command 31f to the controller 31e.

In this embodiment, therefore, the temperature of the outer collar 13 is maintained at a command value by temperature control of the coolant supplied to the coolant path 21, whereby the outer collar 13 makes a quantitatively controlled thermal expansion, which permits the preload of front and rear angular bearings 5 and 7 to be externally controlled to a desirable value. In this embodiment also, even when a large centrifugal force is developed, the angular bearings 5 and 7 are kept from having excessive loads acting thereon, and their service life will not be reduced by such loads.

Figure 4:
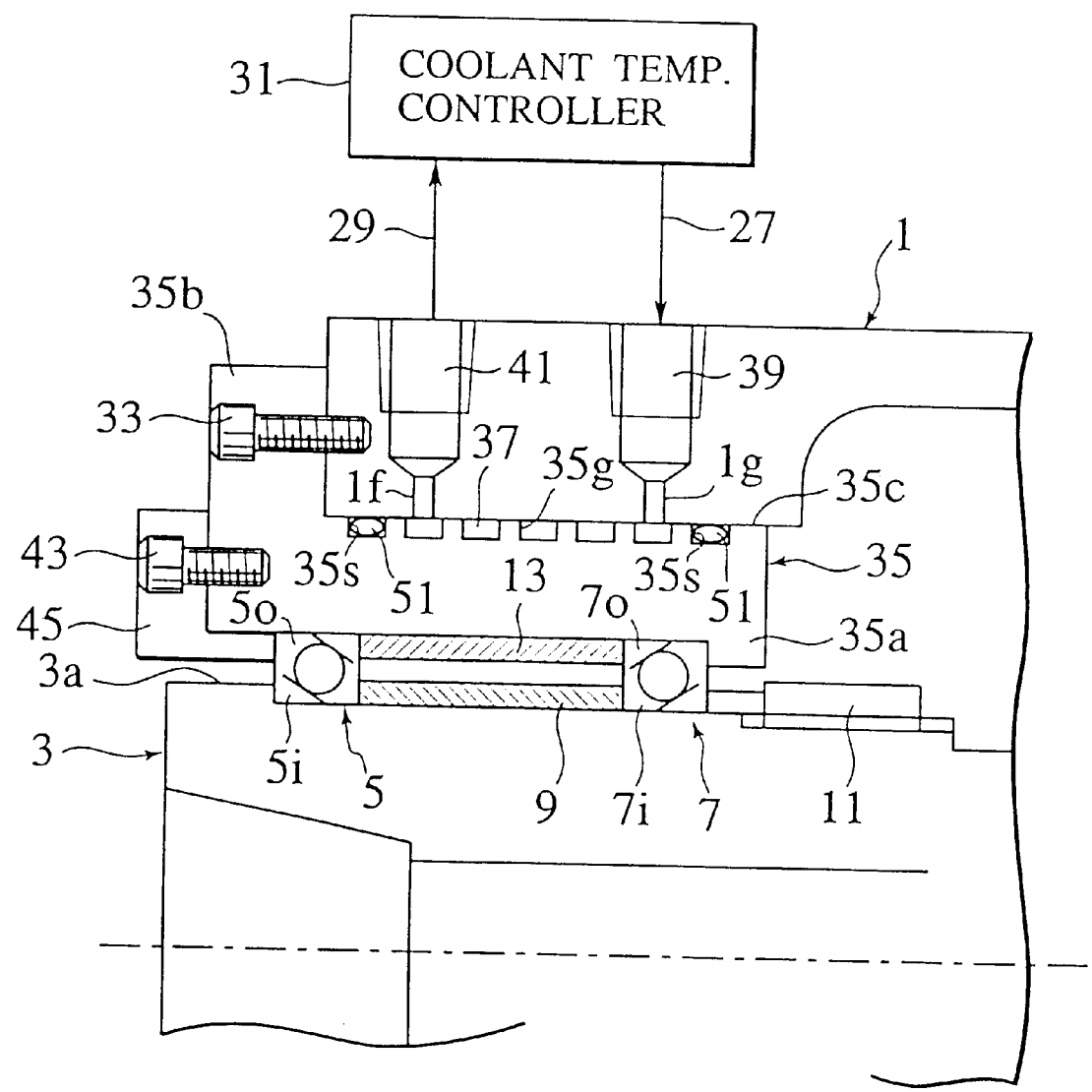
FIG. 4 is a longitudinal section of a bearing device for machine tool spindle according to another embodiment of the invention.

FIG. 4 shows a bearing device for machine tool spindle according to a fourth embodiment of the invention.

This embodiment includes a coolant housing 35 that has a cylindrical body portion 35c inserted between a spindle head body 1 and a combination bearing 5+7 which is fitted on a spindle 3 and which is preloaded in a described manner with inner and outer collars 9 and 13 put between front and rear angular bearings 5 and 7. The coolant housing 35 is fastened at a flanged front end part 35b thereof by screws 33 to a front end face of the spindle head body 1. The coolant housing 35 has a spiral groove 35g formed in an outer circumference of the cylindrical body portion 35c of the housing 35, which groove 35g is ended with front and rear circular slots 35s that are located near front and rear ends of the cylindrical body portion 35c and have sealing elements 51 fitted therein. The spiral groove 35g cooperates with an inner circumference of the spindle head body 1 to define a coolant path 37 that spirally extends substantially over axial length of the combination bearing 5+7. The spindle head body 1 is formed with one or more front radial holes 1f that communicate with a front end of the coolant path 37, and one or more rear radial holes 1g that communicate with a rear end of the coolant path 37. The rear holes 1g communicate with a coolant inlet port 39, which is formed in the spindle head body 1 for supplying a coolant to the front end of the coolant path 37. The front holes 1f communicate with a coolant outlet port 41, which is formed in the spindle head body 1 for taking out the coolant from the front end of the coolant path 37. The coolant inlet and outlet ports 39 and 41 are connected by external coolant lines 27 and 29 to a coolant temperature controller 31.

As the coolant flows in the coolant path 37, the coolant housing 35 is directly cooled at the outside to a temperature that is substantially equivalent to a temperature of the spindle head body 1 that is subjected to an ambient or room temperature, and indirectly at the inside to a slightly higher temperature within an adequate temperature range for a later-described radial clearance control.

The front and rear angular bearings 5 and 7 have their outer races 5o and 7o, which are fitted in an inner circumference of the coolant housing 35 with a designed clearance and which are held in position in a thrust direction, together with the outer collar 13 put between the races 5o and 7o, by combination of a radially inward step part 35a at the rear end of the cylindrical body portion 35c of the coolant housing 35 and a bearing stopper 45 fastened by screws 43 to the front end part 35b of the coolant housing 35.

The outer races 5o and 7o of the angular bearings 5 and 7 are made of a structural steel. The coolant housing 35 is made of a material larger of thermal expansion coefficient than the structural steel of the outer races 5o and 7o, e.g. a stainless steel SUS27B of the JIS (Japanese Industrial Standards) that has a thermal expansion coefficient of $16 \times 10^{-6}$ or near.

According to this embodiment, when the spindle 3 is rotated, as the coolant housing 35 is cooled by the coolant flowing in the coolant path 37, the combination bearing 5+7 is cooled from the outer race (5o, 7o) side, whereby temperature gradients develop so that temperature is different between the coolant housing 35 and the outer races 5o and 7o, between the outer races 5o and 7o and inner races 5i and 7i and inner collar 9. To this point, the coolant housing 35 has a larger thermal expansion coefficient than the outer races 5o and 7o, and a radial thermal expansion of the coolant housing 35 exceeds that of the outer races 5o and 7o so that the angular bearings 5 and 7 are kept from having undue or undesirable radial clearances.

An exemplary case is now supposed such that: when machine tool is operated, the spindle 3, the inner collar 9 and the inner races 5i and 7i have a temperature higher by 32° C. than a room temperature; the outer collar 13 and the outer races 5o and 7o have a temperature higher by 15° C. than the room temperature; and the coolant housing 35 is then cooled at the outside to the room temperature by the coolant flowing in the coolant path 37, and has an average temperature higher by 7.5° C. than the room temperature. It is now supposed that the outer races 5o and 7o have an outside diameter of 150 mm and a thermal expansion coefficient of $10 \times 10^{-6}/°$ C., and that the coolant housing 35 has a zero-clearance inside diameter of 150 mm (as a provisional basis for explanation) and a thermal expansion coefficient of $16 \times 10^{-6}/°$ C.

In this case, the outer races 5o and 7o have a radial thermal expansion relative to an initial state thereof under room temperature, such that: $(1.0 \times 10^{-5}/° \text{C.}) \times 15° \text{C.} \times 150$ mm $= 22.5$ μm, and the coolant housing 35 has a radial thermal expansion relative to an initial state thereof under room temperature, such that: $(1.6 \times 10^{-5}/° \text{C.}) \times 7.5° \text{C.} \times 150$ mm $= 18$ μm. The difference of expansion is 4.5 μm (=22.5

μm -18 μm). A radial clearance over 4.5 μm will permit a smooth action of the combination bearing 5+7, as it is secured between a designed inside diameter of the coolant housing 35 and the outside diameter of the outer races 5o and 7o.

In this connection, if the coolant housing 35 were made of a material having the same thermal expansion coefficient ($10 \times 10^{-6}/°$ C.) as the outer races 5o and 7o, its radial thermal expansion relative to an initial state thereof under room temperature should have been such that: ($1.0 \times 10^{-5}/°$ C.)× 7.5° C.×150 mm =11.25 μm, and the difference of expansion should have been 11.25 μm (=22.5 μm -11.25 μm). Even a radial clearance under 11.25 μm might have caused a blocking of bearings 5 and 7 due to heat generation.

Therefore, according to this embodiment, a radial clearance to be secured for the combination bearing 5+7 is minimized.

As will be seen, the foregoing embodiments may preferably be combined, as necessary, e.g. such that divided outer collars (13a, 13b) of different thermal coefficients according to the second embodiment (FIG. 2) may be employed in the third embodiment (FIG. 3) or the fourth embodiment (FIG. 4); the third embodiment (FIG. 3) may have a coolant housing (35) of the fourth embodiment (FIG. 4) incorporated therein as an integral or fixed member to a spindle head body (1), and extensions of radial holes (1f, 1g) or separate coolant circuits may be formed for supplying and returning a coolant through the coolant housing; and/or a coolant housing (35) of the fourth embodiment (FIG. 4) may be modified to be well heat-conductive in part or as a whole, and an indirect cooling system according to this modification may be employed for positively cooling an outer collar (13) to control an axial dimension and a preload.

While preferred embodiments of the present invention have been described using specific terms, such description is for illustrative purposes, and it is to be understood that changes and variations may be made without departing from the spirit or scope of the following claims.

What is claimed is:

1. A bearing device for machine tool spindle, comprising:

a pair of angular contact ball bearings for supporting a machine tool spindle;

a bearing case for holding the pair of angular contact ball bearings;

an inner collar disposed between inner races of the pair of angular contact ball bearings;

an outer collar disposed between outer races of the pair of angular contact ball bearings, the outer collar having an axial length longer than an axial length of the inner collar to provide a preload to the pair of angular contact ball bearings, the outer collar being formed with a coolant path; and a controller for performing a temperature control of a coolant flowing in the coolant path to control a thermal expansion of the outer collar.

* * * * *